United States Patent
Kirti et al.

(10) Patent No.: US 9,578,126 B1
(45) Date of Patent: Feb. 21, 2017

(54) SYSTEM AND METHOD FOR AUTOMATICALLY DISCOVERING WIDE AREA NETWORK OPTIMIZED ROUTES AND DEVICES

(75) Inventors: Rituraj Kirti, Los Altos, CA (US); Saxon Amdahl, Mountain View, CA (US)

(73) Assignee: F5 Networks, Inc., Seattle, WA (US)

( * ) Notice: Subject to any disclaimer, the term of this patent is extended or adjusted under 35 U.S.C. 154(b) by 1165 days.

(21) Appl. No.: 13/452,748

(22) Filed: Apr. 20, 2012

Related U.S. Application Data

(60) Provisional application No. 61/481,190, filed on Apr. 30, 2011.

(51) Int. Cl.
*G06F 15/173* (2006.01)
*H04L 29/08* (2006.01)

(52) U.S. Cl.
CPC .................. *H04L 67/2876* (2013.01)

(58) Field of Classification Search
CPC ............. H04L 47/2441; H04L 67/2876; H04L 12/4633; H04L 12/4641; H04L 41/12; H04L 45/02; H04L 45/04; H04L 45/745; H04L 47/825; H04L 67/1065; H04L 67/28; H04L 67/2828; H04L 67/288
See application file for complete search history.

(56) References Cited

U.S. PATENT DOCUMENTS

| | | | |
|---|---|---|---|
| 5,862,326 A * | 1/1999 | Bapat ................ | G06F 17/30067 707/E17.01 |
| 5,905,872 A * | 5/1999 | DeSimone et al. ........... 709/245 | |
| 6,987,763 B2 | 1/2006 | Rochberger et al. | |
| 7,113,993 B1 | 9/2006 | Cappiello et al. | |

(Continued)

FOREIGN PATENT DOCUMENTS

| | | |
|---|---|---|
| GB | 2489735 A | 10/2012 |
| WO | 2012/136828 A1 | 10/2012 |

OTHER PUBLICATIONS

Borovick, Lucinda, "Addressing WAN Optimization in the Integrated Services Router", White Paper, Sponsored by: Cisco Systems, Oct. 2010, pp. 1-11, IDC.

(Continued)

*Primary Examiner* — Christopher Biagini
(74) *Attorney, Agent, or Firm* — LeClairRyan, a Professional Corporation

(57) ABSTRACT

A system, medium and method of automatically discovering a wide area network optimized route is disclosed. A client request is received at a second optimization device to access a server. The second optimization device is of a second local area network with respect to a wide area network (WAN) and is configured to communicate with the server. A probe request is received at the second optimization device from a first optimization device of a first local area network. The probe request establishes an optimization route with the first optimization device. A probe response is sent to the first optimization device, wherein the probe response provides (Continued)

identifying information of the second optimization device. A paired relationship is established, wherein configuration information of the first and second optimization devices are exchanged. An optimization route based on the configuration information is exchanged between the paired first and second optimization devices.

12 Claims, 7 Drawing Sheets

(56) References Cited

U.S. PATENT DOCUMENTS

| | | | |
|---|---|---|---|
| 7,120,666 B2* | 10/2006 | McCanne et al. | 709/203 |
| 7,206,282 B1 | 4/2007 | Goldman et al. | |
| 7,454,480 B2 | 11/2008 | Labio et al. | |
| 2003/0005144 A1* | 1/2003 | Engel et al. | 709/235 |
| 2003/0108052 A1 | 6/2003 | Inoue et al. | |
| 2004/0215746 A1* | 10/2004 | McCanne et al. | 709/219 |
| 2004/0243703 A1* | 12/2004 | Demmer et al. | 709/224 |
| 2004/0267920 A1 | 12/2004 | Hydrie et al. | |
| 2004/0268358 A1 | 12/2004 | Darling et al. | |
| 2005/0055435 A1 | 3/2005 | Gbadegesin et al. | |
| 2005/0125553 A1* | 6/2005 | Wu et al. | 709/233 |
| 2005/0273645 A1* | 12/2005 | Satran | G06F 11/2033 714/4.1 |
| 2006/0161577 A1 | 7/2006 | Kulkarni et al. | |
| 2006/0233106 A1 | 10/2006 | Achlioptas et al. | |
| 2006/0242300 A1 | 10/2006 | Yumoto et al. | |
| 2006/0248194 A1* | 11/2006 | Ly et al. | 709/226 |
| 2007/0016662 A1 | 1/2007 | Desai et al. | |
| 2007/0104115 A1* | 5/2007 | Decasper et al. | 370/254 |
| 2007/0283023 A1* | 12/2007 | Ly et al. | 709/227 |
| 2008/0256224 A1 | 10/2008 | Kaji et al. | |
| 2009/0125625 A1 | 5/2009 | Shim et al. | |

OTHER PUBLICATIONS

Cisco Systems, "Cisco Performance Routing", Data Sheet, 2010, pp. 1-10.
Cisco Systems, "Cisco Performance Routing (PfR)", PfR: Technology_Overview, 2010, pp. 1-23.
Cisco Systems, "Cisco Wide Area Application Services Software Version 4.4 Technical Overview", White Paper, 2011, pp. 1-24.
Riverbed Technology, "Riverbed Optimization System (RiOS) 6.1, A Technical Overview", White Paper, 2009, pp. 1-27.
Riverbed Technology, "Riverbed Certified Solutions Professional (RCSP) Study Guide, Exam 199-01 for RiOS v5.0", Aug. 2009, Version 2.0.2, see pp. 30-67.

* cited by examiner

SYSTEM AND METHOD FOR AUTOMATICALLY DISCOVERING WIDE AREA NETWORK OPTIMIZED ROUTES AND DEVICES

STATEMENT OF RELATED APPLICATION

The present application claims the benefit of priority based on U.S. Provisional Patent Application Ser. No. 61/481,190, filed on Apr. 30, 2011, in the name of inventors Rituraj Kirti and Saxon Amdahl, entitled "System and Method for Automatically Discovering Wide Area Network Optimized Routes and Devices", all commonly owned herewith.

TECHNOLOGICAL FIELD

This technology generally relates to web optimization technology, and more particularly, to a system and method for automatically discovering wide area network optimized routes and devices.

BACKGROUND

Wide Area Networks (WANs) are designed to allow efficient network communications to occur among and between network devices in one or more Local Area Networks (LAN). In particular, WAN optimization devices are used to optimize data transfers over the WANs between a company's data centers or LANs. However, configuration complexities arise with regard to the WAN optimization devices when new network devices (e.g. servers) are added to, or removed from, one or more LANs. In particular, it is a significant burden to ensure that the configuration information of the network devices are up to date when network devices are added or removed.

What is needed is a system and method for automatically discovering wide area network optimized routes and devices.

SUMMARY

In an aspect, the method of automatically discovering a wide area network optimized route between at least one client device and at least one server is disclosed. The method comprises receiving a request at a second optimization device from a client device to access a server in a network. The second optimization device is of a second local area network with respect to a wide area network (WAN) and is configured to communicate with the server. The method includes sending the request to the server and receiving, at the second optimization device, a probe request sent from a first optimization device of a first local area network over the WAN to the server. The probe request is configured to establish an optimization route with the first optimization device. The method includes sending a probe response to the first optimization device, wherein the probe response provides identifying information of the second optimization device. The method includes establishing a paired relationship with the first optimization device, wherein configuration information of the first and second optimization devices are exchanged. The method includes establishing an optimization route based on the exchanged configuration information between the paired first and second optimization devices, wherein the optimization route allows efficient network communications to occur over the WAN between the client device and the server via the first and second paired optimization devices.

In an aspect, a non-transitory machine readable medium having stored thereon instructions for automatically discovering a wide area network optimized route between at least one client device and at least one server device is disclosed. The medium comprises machine executable code which when executed by at least one processor of a second optimization device, causes the second optimization device to receive a request from a client device to access a server. The second optimization device is of a second local area network with respect to a wide area network (WAN). The request is sent to the server over the wide area network. A probe request is received from a first optimization device of a first local area network over the WAN, wherein the probe request is configured to establish an optimization route with the first optimization device. A probe response is send to the first optimization device, wherein the probe response provides identifying information of the second optimization device. A paired relationship is established with the first optimization device, wherein configuration information is exchanged between the first and second optimization devices. An optimization route is established based on the exchanged configuration information between the paired first and second optimization devices, wherein the optimization route allows efficient network communications to occur over the WAN between the client device and the server via the first and second paired optimization devices.

In an aspect, a second optimization device of a second local area network configured to communicate with one or more servers is disclosed. The second optimization device comprises a network interface that is capable of receiving and transmitting network data packets over a wide area network (WAN) and communicating with one or more servers in the second local area network. The device includes a memory having stored thereon code embodying machine executable programmable instructions and a processor configured to execute the stored programming instructions in the memory. The instructions which, when executed by the processor, causes the processor to receive a request from a client device via the WAN to access a server and send the request to the server. A probe request is received from a first optimization device of a first local area network, wherein the probe request is configured to establish a route optimizing pairing relationship between the first and second optimization devices. A probe response is sent to the first optimization device, wherein the probe response provides identifying information of the second optimization device. A paired relationship is established with the first optimization device after the probe response is received by the first network traffic management, wherein configuration information of the first and second optimization devices are exchanged. An optimization route is established based on the exchanged configuration information. The optimization route is configured to allow efficient network communications to occur over the WAN at least between the client device and the requested server via the first and second paired optimization devices.

In an aspect, a method of automatically discovering a wide area network optimized route between at least one client device and at least one server device is disclosed. The method comprises receiving a request at a first optimization device from a client device to access a server, wherein the first optimization device is of a first local area network with respect to a wide area network (WAN). The method includes sending the request from the first optimization device to the server over the wide area network. The method includes sending a probe request from the first optimization device over the WAN to the server, wherein the probe request is intercepted by a second optimization device of a second local area network with respect to the WAN. The method includes receiving, at the first optimization device, a probe response from the second optimization device, wherein the probe response provides identifying information of the second optimization device. The method includes establishing a paired relationship with the second optimization device, wherein at least a portion of configuration information of the second optimization device and at least the server is received and stored in a memory. The method includes establishing an optimization route between the client device and the server via the second paired optimization device over the WAN.

In an aspect, a computer environment comprises a first optimization device of a first local area network configured to communicate with one or more client devices. The first optimization device is configured to receive a request from a client device to access a server, wherein the first optimization device generates a probe request configured to establish a route optimizing pairing relationship with one or more optimization devices in a second local area network. The computer environment comprises a second optimization device of a second local area network configured to communicate with one or more servers. The second optimization device is configured to receive the probe request from the first optimization device and send a probe response to the first optimization device providing identifying information of the second optimization device to establish a paired relationship between the first and the second optimization devices. An optimization route is established between the pair first and second optimization devices based on their exchanged configuration information. The optimization route is configured to allow efficient network communications to occur over the WAN at least between the client device and the requested server via the first and second paired optimization devices.

In one or more of the above aspects, it is determined whether configuration information of the requested server is stored in the memory of the second optimization device. A probe response is intercepted from the server for the probe request originating from the client device if there is no configuration information of the requested server in the memory of the second optimization device. The probe response is parsed from the server and configuration information of the server from the parsed probe response is stored in the memory.

In one or more of the above aspects, the request is addressed to be handled by a third optimization device, wherein a traffic direction device routes the request to the second optimization device. The second optimization device being configured to modify header information of the request with routing information of the second optimization device. The modified request is sent to the server, wherein a response from the server is automatically routed through the second optimization device instead of the third optimization device based on the modified header information.

In one or more of the above aspects, the second optimization device again transmits the probe request to the server when a probe response is not received from the server within a predetermined amount of time.

In one or more of the above aspects, the paired first and second optimization devices communicate configuration information with one another via a secured control connection.

In one or more of the above aspects, the first optimization device communicates the received configuration information from the paired second optimization device to at least one other optimization device that is paired with the first optimization device to establish a pairing relationship between the first, second and the at least one other optimization device.

Figure 1:
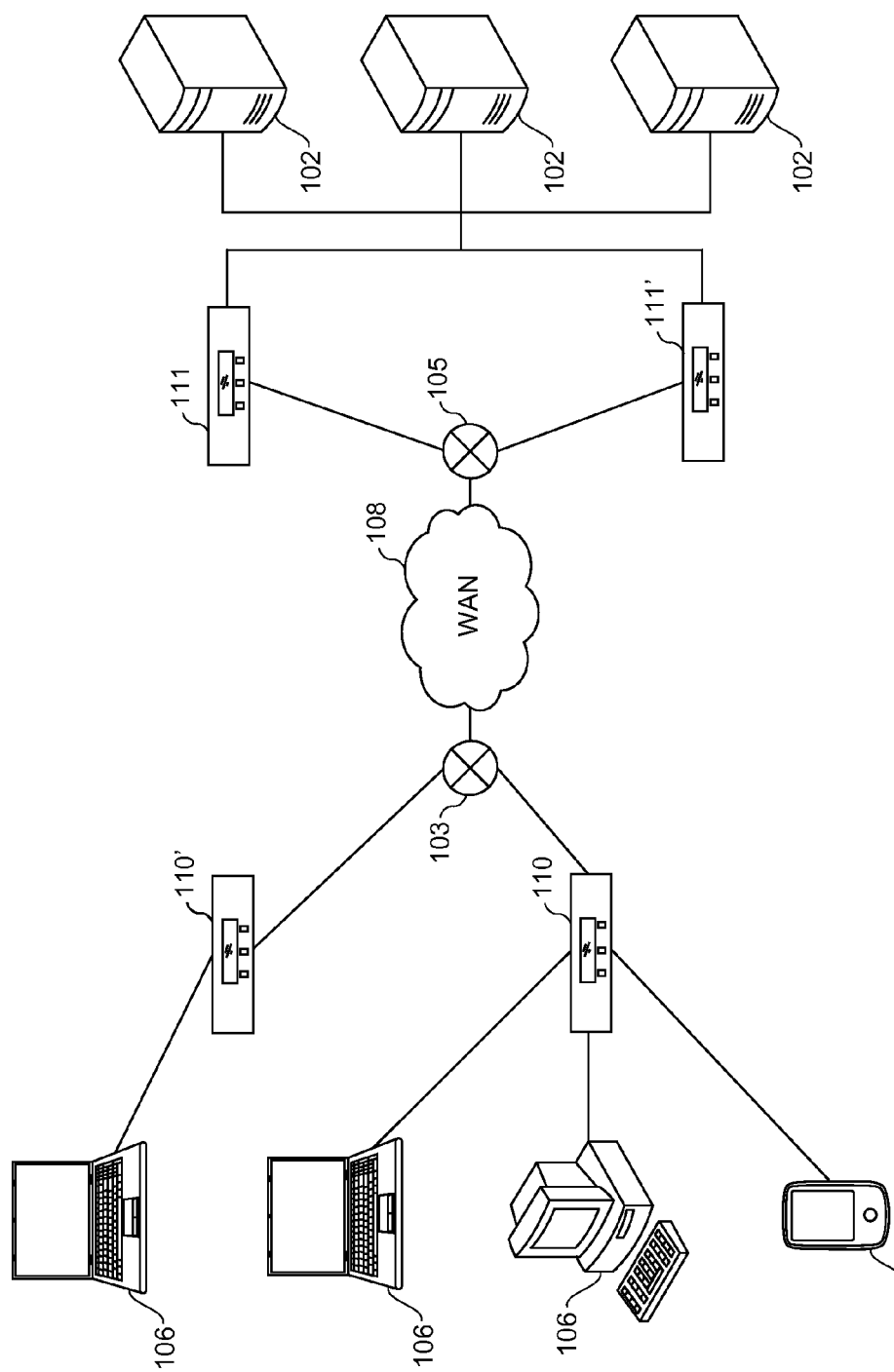
FIG. 1 is a diagram of an example system environment that includes a plurality of wide area network optimization devices in accordance with an aspect of the present disclosure.

While these examples are susceptible of embodiment in many different forms, there is shown in the drawings and will herein be described in detail preferred examples with the understanding that the present disclosure is to be considered as an exemplification and is not intended to limit the broad aspect to the embodiments illustrated.

DETAILED DESCRIPTION

FIG. 1 is a diagram of an example system environment that includes a plurality of Wide Area Network (WAN) optimization devices (also referred to herein as "optimization device") in accordance with an aspect of the present disclosure. As shown in FIG. 1, the example system environment 100 employs a plurality of network devices comprising client devices 106, servers 102, and optimization devices 110, 110', 111, 111'. As shown in FIG. 1, the example environment 100 includes one or more client-side optimization devices 110, 110' of a first local area network 120A with respect to the wide area network 108. FIG. 1 also illustrates one or more server-side optimization devices 111, 111' of a second local area network 120B with respect to the wide area network 108. The example system environment 100 may include other numbers and types of network devices in other arrangements. In particular, although only two optimization devices 110, 110' are shown on the client side 120A and only two optimization devices 111, 111' are shown on the server side 120B, any number of optimization devices are contemplated.

The optimization devices 110, 110', 111, 111' are coupled to the client devices 106, 106' and the servers 102 via local area network (LAN) 104 and client devices 106 via network 108. Generally, requests sent over the network 108 from client devices 106 towards servers 102 are received and handled by the optimization device(s).

Client devices 106, 106' comprise network devices capable of connecting to other network devices, such as optimization device(s) 110, 110' and servers 102. Such connections are performed over wired and/or wireless networks, such as network 108, to send and receive data, such as for Web-based requests, receiving responses to requests and/or performing other tasks. Non-limiting and non-exhausting examples of such client devices include personal computers (e.g., desktops, laptops, tablets), mobile and/or smart phones and the like. In an example, client devices 106, 106' run Web browsers that may provide an interface for operators, such as human users, to interact with for making requests for resources to different web server-based applications or Web pages via the network 108, although other server resources may be requested by clients. One or more Web-based applications may run on the server 102 that provide the requested data back to one or more exterior network devices, such as client devices 106, 106', in the form of responses.

Network 108 comprises a publicly accessible network, such as the Internet; however, it is contemplated that the network 108 may comprise other types of private and public networks. Communications, such as requests from clients 106 and responses from servers 102, take place over the network 108 according to standard network protocols, such as the HTTP and TCP/IP protocols in this example. However, the principles discussed herein are not limited to this example and can include other protocols. Further, it should be appreciated that network 108 may include local area networks (LANs), wide area networks (WANs), direct connections and any combination thereof, as well as other types and numbers of network types. On an interconnected set of LANs or other networks, including those based on differing architectures and protocols, routers, switches, hubs, gateways, bridges, and other intermediate network devices may act as links within and between LANs and other networks to enable messages and other data to be sent from and to network devices. Also, communication links within and between LANs and other networks typically include twisted wire pair (e.g., Ethernet), coaxial cable, analog telephone lines, full or fractional dedicated digital lines including T1, T2, T3, and T4, Integrated Services Digital Networks (IS-DNs), Digital Subscriber Lines (DSLs), wireless links including satellite links and other communications links known to those skilled in the relevant arts. In essence, the network 108 includes any communication method by which data may travel between client devices 106, 106', servers 102 and optimization devices 110, 110', 111, 111' and the like.

LAN 104 comprises a private local area network that includes the optimization device 111, 111' coupled to the one or more servers 102, although the LAN 104 may comprise other types of private and public networks with other devices. Networks, including local area networks, besides being understood by those skilled in the relevant arts, have already been generally described above in connection with network 108 and thus will not be described further.

The servers 102 comprise one or more server computing machines capable of operating one or more Web-based and/or non Web-based applications that may be accessed by network devices (e.g. client devices, optimization devices) over the network 108. The servers 102 may provide other data representing requested resources, such as particular Web page(s), image(s) of physical objects, and any other objects, responsive to requests from other network devices.

It should be noted that the server 102 may perform other tasks and provide other types of resources. It should be noted that while only three servers 102 are shown in the environment 100 depicted in FIG. 1, other numbers and types of servers may be coupled to the optimization devices 110, 110', 111, 111'. It is also contemplated that one or more of the servers 102 may be a cluster of servers managed by one or more optimization devices 110, 110', 111, 111'.

As per the TCP/IP protocols, requests from client devices 106, 106' may be sent as one or more streams of data packets over the network 108 to the servers 102, via one or more optimization devices 110, 110', 111, 111'. Such protocols can be used by the network devices to establish connections, send and receive data for existing connections, and the like.

It is to be understood that the one or more servers 102 may be hardware and/or software, and/or may represent a system with multiple servers that may include internal or external networks. In an aspect, the servers 102 may be any version of Microsoft® IIS servers or Apache® servers, although other types of servers may be used. In an aspect, the server 102 utilizes software to allow it run the RADIUS protocol (Remote Access Dial In User Services) to provide authentication, authorization, and accounting (AAA) services for dial-up PPP/IP and Mobile IP access. Further, additional servers may be coupled to the network 108 and many different types of applications may be available on servers coupled to the network 108.

As shown in the example environment 100 depicted in FIG. 1, one or more optimization devices 110, 110' are interposed between client devices 106 and the network 108, whereas one or more optimization devices 111, 111' are interposed, via LAN 104, between the network 108 and the servers 102. As shown in FIG. 1, one or more routing devices 105 may be interposed, via LAN 104 between the network 108 and the one or more optimization devices 111, 111'. Again, the environment 100 could be arranged in other manners with other numbers and types of network devices. It should be understood that the devices and the particular configuration shown in FIG. 1 are provided for exemplary purposes only and thus are not limiting.

Generally, the one or more optimization devices 110, 110', 111, 111' manage network communications, which may include one or more client requests and server responses, over the network 108 between the client devices 106, 106' and the servers 102. Client requests may be destined for one or more servers 102, and may take the form of one or more data packets over the network 108. The requests pass through one or more intermediate network devices and/or intermediate networks, until they ultimately reach the one or more optimization devices 110, 110', 111, 111'. In any case, the one or more optimization devices 110, 110', 111, 111' may manage the network communications by performing several network traffic related functions involving the communications. Such functions include, but are not limited to, load balancing, access control, and validating HTTP requests using JavaScript code.

In an aspect, the optimization device may also perform load balancing operations with its set of connected endpoint network devices. In this aspect, the load-balancing optimization device may include reachability information, bandwidth information and other load balancing information of its endpoint network devices in the configuration information that is shared with the other paired optimization device.

In an aspect, as shown in FIG. 1, one or more optimization devices may be located behind a router device, gateway device or other traffic directing device 103, 105. In an aspect, the traffic directing device 105 may direct the client device's 106 request and/or the device's 110 probe request to an out-of-band optimization device 111' in which the request was to be routed through the in-band optimization device 111.

To ensure that the responses to a request are properly routed to the destination device 106 in the event that the response is routed via the out-band optimization device 111', the optimization device 111' translates the request to include the out-of-band optimization device 111'. This ensures that any responses to the request are properly routed through the out-of-band optimization device 111' instead of the in-band optimization device 111 and effectively reach the correct destination device 106.

In addition, two or more computing systems or devices may be substituted for any one of the devices in the system 100. Accordingly, principles and advantages of distributed processing, such as redundancy, replication, and the like, also can be implemented, as desired, to increase the robustness and performance of the devices and systems of the system 100. The system 100 may also be implemented on a computer system or systems that extend across any network environment using any suitable interface mechanisms and communications technologies including, for example telecommunications in any suitable form (e.g., voice, modem, and the like), Public Switched Telephone Network (PSTNs), Packet Data Networks (PDNs), the Internet, intranets, a combination thereof, and the like.

Figure 2A:
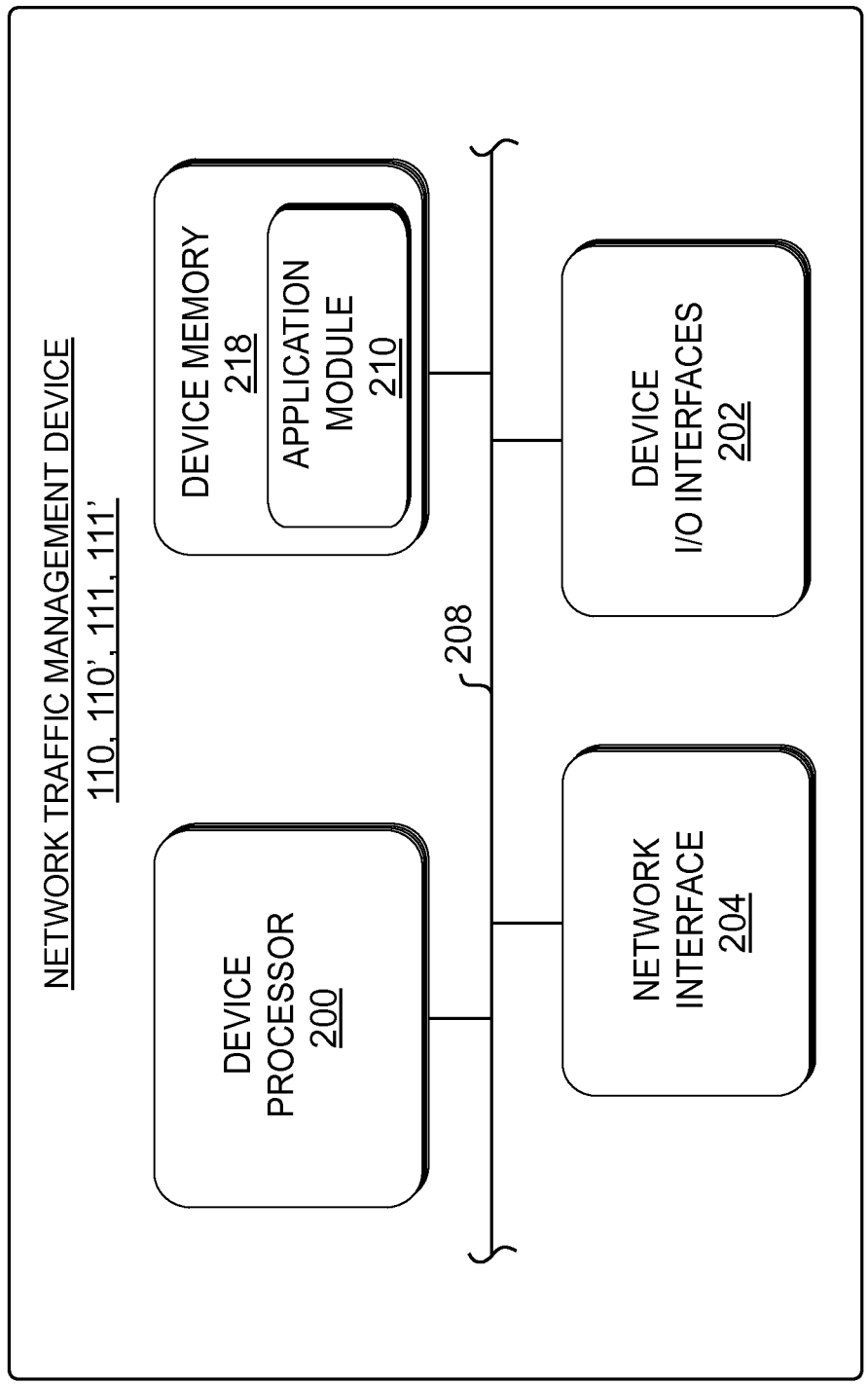
FIG. 2A is a block diagram of a wide area network optimization device shown in FIG. 1 in accordance with the present disclosure.
Figure 2B:
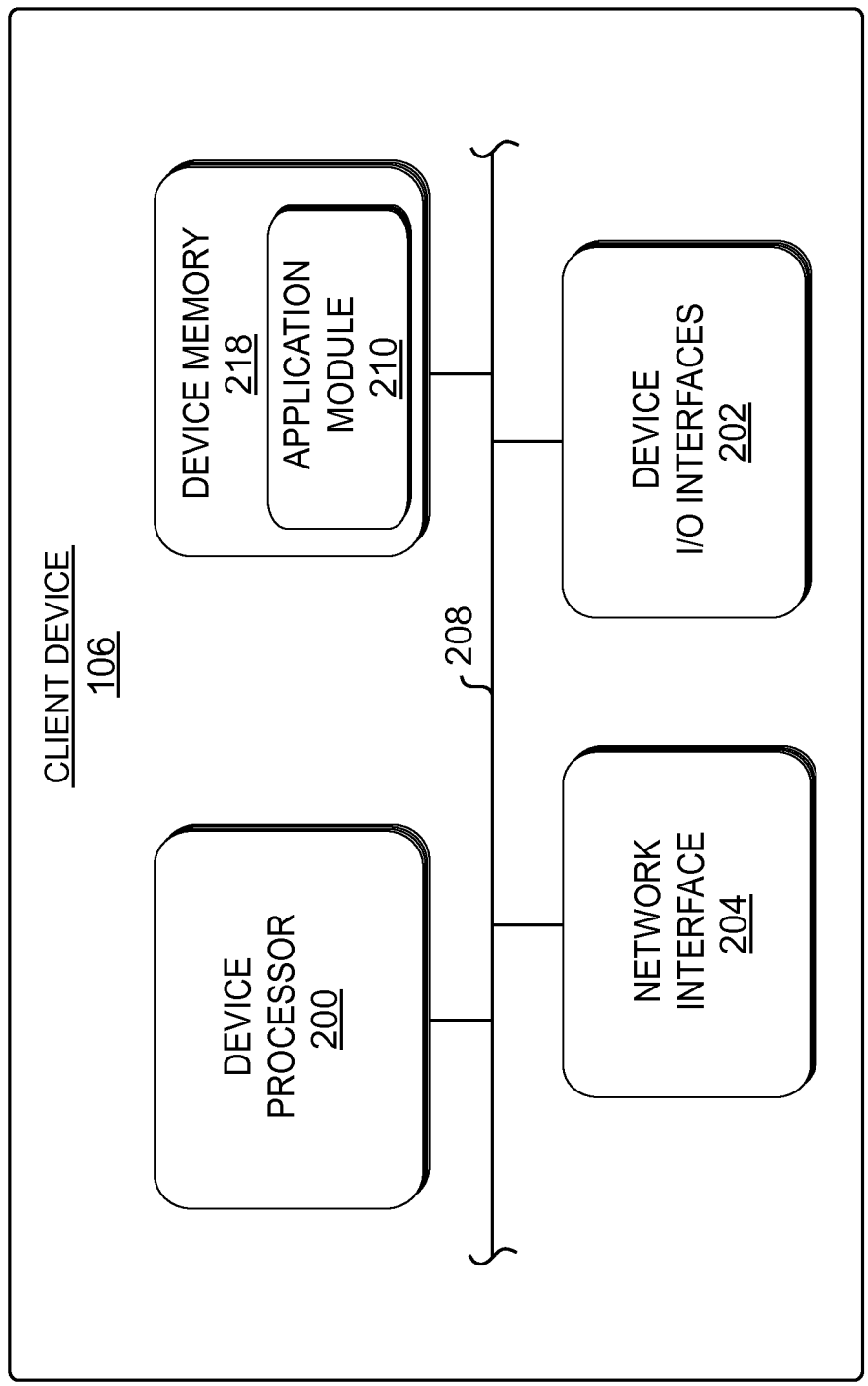
FIG. 2B is a block diagram of a client device shown in FIG. 1 in accordance with the present disclosure.

FIG. 2A is a block diagram of a Wide Area Network optimization device shown in FIG. 1 in accordance with the present disclosure. FIG. 2B is a block diagram of a client device shown in FIG. 1 in accordance with the present disclosure. Referring now to FIG. 2A, an example optimization device includes a device processor 200, device I/O interfaces 202, network interface 204 and device memory 218, which are coupled together by bus 208. It should be noted that the optimization device could include other types and numbers of components.

Device processor 200 comprises one or more microprocessors configured to execute computer/machine readable and executable instructions stored in device memory 218. Such instructions, when executed by one or more processors, implement network traffic management related functions of the optimization device 110. In addition, the instructions, when executed by one or more processors, implement the application module 210 to perform one or more portions of the processes illustrated in FIGS. 3A, 3B, 4A and 4B. The processor 200 may comprise other types and/or combinations of processors, such as digital signal processors, microcontrollers, application specific integrated circuits ("ASICs"), programmable logic devices ("PLDs"), field programmable logic devices ("FPLDs"), field programmable gate arrays ("FPGAs"), and the like.

Device I/O interfaces 202 comprise one or more user input and output device interface mechanisms. The interface may include a computer keyboard, mouse, touchscreen display device, and the corresponding physical ports and underlying supporting hardware and software to enable the optimization device 110 to communicate with the outside environment. Such communication may include accepting user data input and to provide user output, although other types and numbers of user input and output devices may be used. Additionally or alternatively, as will be described in connection with network interface 204 below, the one or more optimization devices 110, 110', 111, 111' may communicate with the outside environment for certain types of operations (e.g., configuration) via a network management port.

Network interface 204 comprises one or more mechanisms that enable the one or more optimization devices 110, 110', 111, 111' to engage in network communications over the LAN 104 and the network 108 using one or more desired protocols (e.g. TCP/IP, UDP, HTTP, RADIUS, DNS). However, it is contemplated that the network interface 204 may be constructed for use with other communication protocols and types of networks. Network interface 204 is sometimes referred to as a transceiver, transceiving device, or network interface card (NIC), which transmits and receives network data packets to one or more networks, such as LAN 104 and network 108. In an example where the one or more optimization devices 110, 110', 111, 111' include more than one device processor 200 (or a processor 200 has more than one core), each processor 200 (and/or core) may use the same single network interface 204 or a plurality of network interfaces 204. Further, the network interface 204 may include one or more physical ports, such as Ethernet ports, to couple the one or more optimization devices 110, 110', 111, 111' with other network devices, such as servers 102. Moreover, the interface 204 may include certain physical ports dedicated to receiving and/or transmitting certain types of network data, such as device management related data for configuring the one or more optimization devices 110, 110', 111, 111' and/or client request/server response related data.

Bus 208 may comprise one or more internal device component communication buses, links, bridges and supporting components, such as bus controllers and/or arbiters. The bus enables the various components of the one or more optimization devices 110, 110', 111, 111', such as the processor 200, device I/O interfaces 202, network interface 204, and device memory 218, to communicate with one another. However, it is contemplated that the bus may enable one or more components of the one or more optimization devices 110, 110', 111, 111' to communicate with components in other devices as well. Example buses include HyperTransport, PCI, PCI Express, InfiniBand, USB, Firewire, Serial ATA (SATA), SCSI, IDE and AGP buses. However, it is contemplated that other types and numbers of buses may be used, whereby the particular types and arrangement of buses will depend on the particular configuration of the one or more optimization devices 110, 110', 111, 111'.

Device memory 218 comprises computer readable media, namely computer readable or processor readable storage media, which are examples of machine-readable storage media. Computer readable storage/machine-readable storage media may include volatile, nonvolatile, removable, and non-removable media implemented in any method or technology for storage of information. Such storage media includes computer readable/machine-executable instructions, data structures, program modules, or other data, which may be obtained and/or executed by one or more processors, such as device processor 200. Such instructions, when executed by one or more processors, causes or allows the network device to perform actions including implementing an operating system for controlling the general operation of the one or more optimization devices 110, 110', 111, 111' to manage network traffic, implement the application module 210, and perform the process described in FIGS. 3 and 4 in accordance with the present disclosure.

Examples of computer readable storage media include RAM, BIOS, ROM, EEPROM, flash/firmware memory or other memory technology, CD-ROM, digital versatile disks (DVD) or other optical storage, magnetic cassettes, magnetic tape, magnetic disk storage or other magnetic storage devices, or any other medium which can be used to store the information.

Application module 210 is depicted in FIG. 2 as being within memory 218 for exemplary purposes only; it should be appreciated the module 210 may be alternatively located elsewhere. Generally, instructions embodying the application module 210 are executed by the device processor 200 to execute the process described in FIGS. 3A, 3B, 4A and 4B. Details of the functions of the application module 210 will be discussed below.

It should be noted that although the above components described in FIG. 2A are in relation to one or more optimization devices 110, 110', 111, 111', the above components can also be found in a client device 106, 106' as illustrated in FIG. 2B. In particular, the system and method of the present disclosure may be implemented in a client device 106, 106', whereby the client device 106, 106' utilizes the auto-discovery process to find another network device (e.g. authentication server) over a Virtual Private Network (VPN) connection tunnel.

Figure 3A:
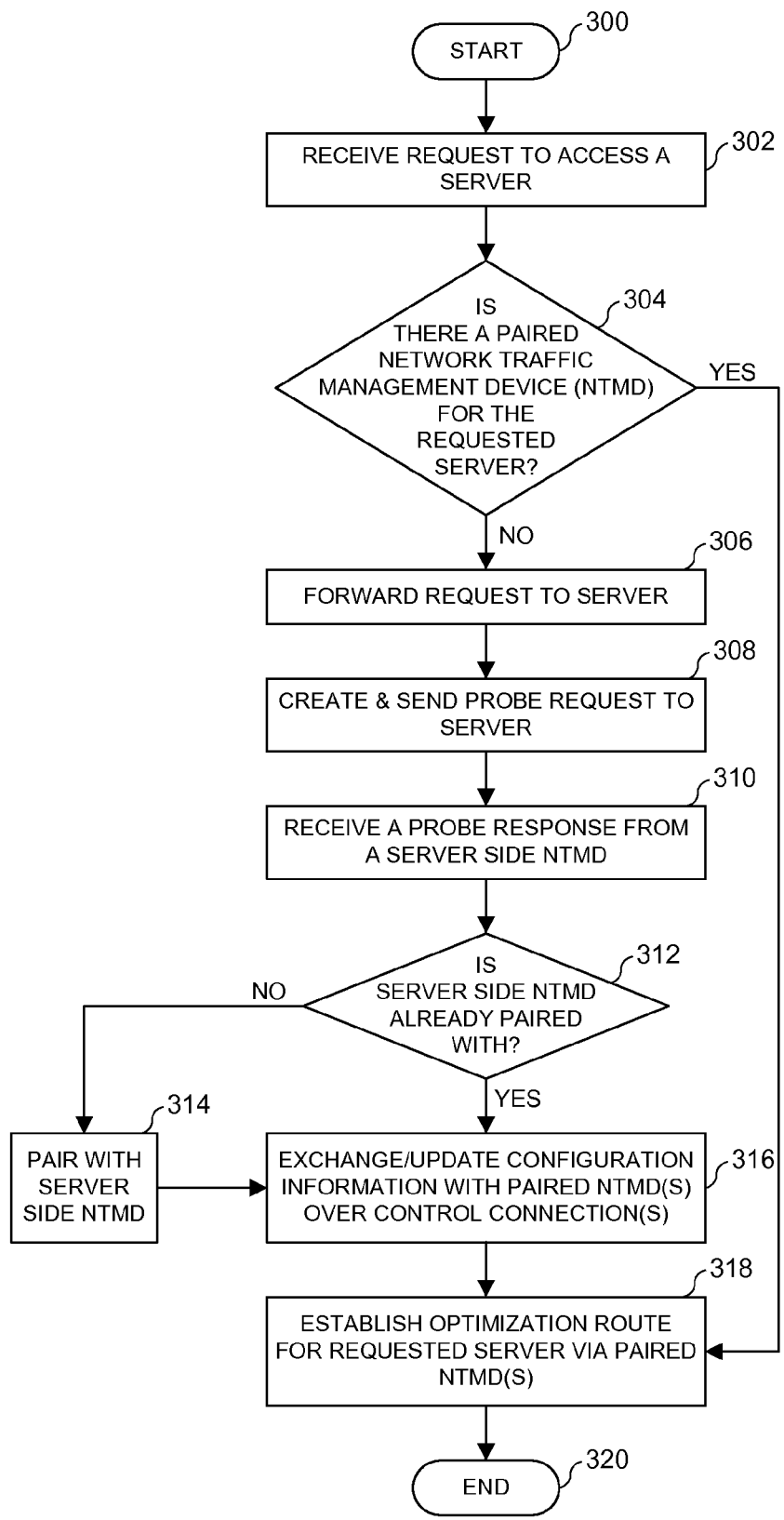
FIG. 3A is an example flow chart diagram depicting portions of processes for automatically discovering wide area network optimized routes and devices in accordance with the present disclosure.
Figure 3B:
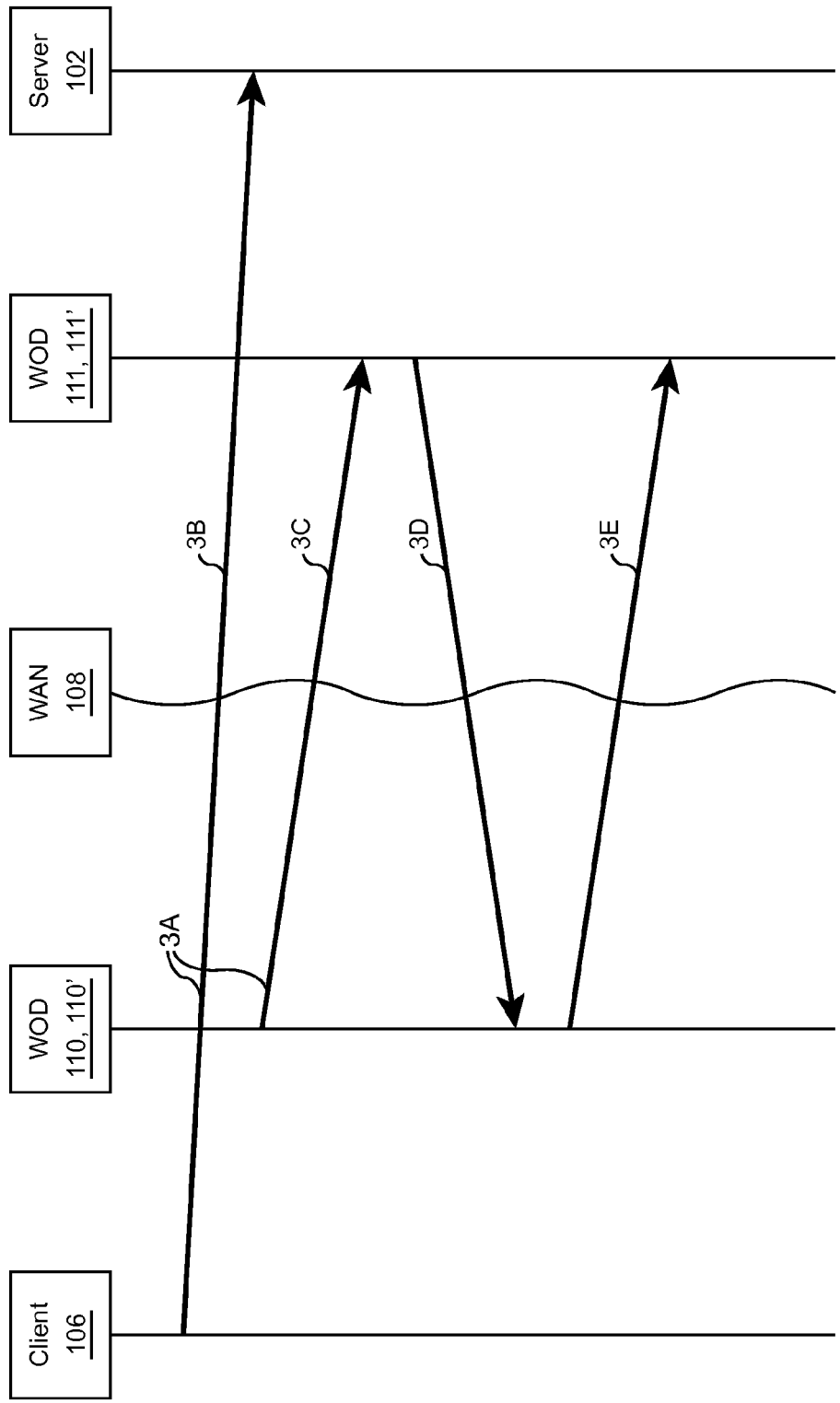
FIG. 3B illustrates an example ladder diagram depicting the processes described in FIG. 3A in accordance with an aspect of the present disclosure.

In general, the system and method of the present disclosure, in an aspect, is configured to allow one or more optimization devices to automatically discover one or more other optimization devices to set up an optimization tunnel or route over a wide area network (WAN), as discussed in relation to FIGS. 3A and 3B. In an aspect, the system and method of the present disclosure is configured to allow one or more optimization devices to automatically discover one or more network devices (e.g. server devices) which are communicating with one or more optimization devices across the wide area network, as discussed in relation to FIGS. 4A and 4B.

In an aspect, an optimization route with a particular one or more optimization devices 111, 111' is determined based on one or more factors. In an aspect, one or more factors that may be taken into account, in determining whether to establish and/or use an optimization route, is the health of the optimization device(s) 111, 111'. In an aspect, the health of a remote optimization device is determined through both active and passive monitoring. In an aspect, active monitoring can include health probes across a control channel to which the remote device must respond in order to be considered healthy. These probes can be messages sent on a control connection, ICMP packets, or other methods of testing the health of the remote system. Passive monitoring can involve monitoring of dataplane connections between the optimization devices. A remote optimization device may be considered healthy even if active monitoring methods fail as long as optimized data is able to flow across the optimization devices.

When establishing an optimization route, two or more optimization devices are paired with one another in which they share their own configuration information as well as the configuration information of the network devices (e.g. servers, client devices) with which they communicate.

In an aspect, a client device 106 in the first LAN 120A initially sends a request to access a service/resource from a server 102 in the second LAN 120B. In the example, the one or more optimization devices 110, 110' intercepts the client device's request and determines whether there is an already established optimization route over the WAN 108 with one or more paired server-side optimization devices 111, 111' in which the request can be sent in an optimized manner to the destination server 102 via the optimization device(s) 111, 111'.

If there is no paired optimization device 111 that has configuration information of the requested server 102, the client side optimization device 100 is able to create and send an auto-discovery probe request to the requested server 102.

In particular, the auto-discovery probe request can be configured in TCP option fields, as Internet Control Message Protocol (ICMP) probes and the like. The probe request is created based on the routing information taken from the client device's 106 request. The probe requests allow the optimization device(s) 110, 110' to pair up with the server side optimization device(s) 111, 111'. In an aspect, the server side optimization device(s) 111, 111' has the address of the requested server 102. In another aspect, the server side optimization device(s) 111, 111' does not have the address of the requested server 102, but is merely in the data path between the client side optimization device(s) 110, 110' and the requested server 102. In particular, by being in the data path, the server side optimization device(s) 111, 111' allows it to receive the probe, which is addressed to the requested server 102. In this aspect, however, the server side optimization device(s) 111, 111' needs to respond to the probe to allow discovery of the device(s) 111, 111'.

Once paired or discovered, the optimization devices 110, 111 establish an encrypted (e.g. SSL) control connection which allows them to then exchange their own configuration information using an XML or other type of messaging scheme over the encrypted control connection. In an aspect, the configuration information may include information of the optimization device itself including, but not limited to, current health information, its current capabilities, cache allocation information, version number, device name, list of routes, special hardware information, compression capabilities and the like. The configuration information may also include connection information of the endpoint network devices (e.g. servers, client devices, other optimization devices) which the optimization device communicates with (and has configuration information thereof).

In an aspect, once the client side optimization devices 110, 111 are paired or discovered, either or both of the devices 110, 111 may share the newly acquired configuration information to one or more other peer optimization devices 110', 111'. This sharing of configuration information allows other optimization devices 110', 111' to be updated of new or modified optimization routes to enhance handling of network traffic over the environment 100.

In determining that the optimization device has connection information for the requested network device (e.g. server 102), the optimization device may confirm that the requested network device is online and currently operating before sending a response to the probe request. In the above example, the optimization device 111 may wait until a response is received from the server 102 within a predetermined amount of time before sending a response to the probe request. In an aspect where no response is received from the server 102, the optimization device 111 may ping the server 102 a predetermined number of times before it determines that the server 102 is no longer on-line and is not operating. The optimization device 111 will thereby update its server connection information and notify one or more other paired optimization devices 110, 110' 111' of this change over the control connection.

FIG. 3A is an example flow chart diagram depicting portions of a process for automatically discovering wide area network optimized routes and devices in accordance with the present disclosure. FIG. 3B illustrates a ladder diagram directed to describe the process for detecting a peer optimization device in FIG. 3A in accordance with an aspect of the present disclosure. As shown in FIG. 3B, the ladder diagram is shown to include the one or more client devices 106, the one or more client-side optimization devices 110, 110', the wide area network 108, the one or more server-side optimization devices 111, 111' and one or more servers 102.

With respect to FIG. 3A the process, described with respect to the client-side optimization device 110, begins at Block 300 when an endpoint network device, such as a client device 106, sends a request to access a resource from a destination server 102 via the wide area network 103 (shown as arrow 3A in FIG. 3B).

The request is intercepted and processed by the client-side optimization device 110 (Block 302). It should be noted that although optimization device 110 is described above, it is contemplated that optimization device 111 may intercept and process the request from client device 106' (see FIG. 1).

The client's request will typically be a TCP based SYN message, although other protocol based messages are contemplated. In processing the request, the optimization device 110 parses the request to identify the IP address and/or other identifying information of the requested server 102. The identifying information of the requested server 102 allows the optimization device 110 to determine whether there is an already paired server-side optimization device 111 with established optimization route for that requested server (Block 304).

In an aspect, the optimization device 110 accesses one or more local and/or remote memories and parses its stored configuration information to determine if any optimization devices 111, 111' for the requested server 102 are paired to the optimization device 110. If it is determined that the optimization devices 110, 111 are already paired, the process continues to Block 318.

If no optimization devices for the requested server 102 are found in the memory, the optimization device 110 forwards the request over the network 108 toward the requested server 102 (Block 306). This transmission is shown as Arrow 3B in FIG. 3B. In addition, using the parsed information, the optimization device 110 creates and sends a probe request (shown as Arrow 3C in FIG. 3B) over the network 108 independently of the actual request (Arrows 3A and 3B) that originated from the client device 106 (Block 308). In an aspect, the probe request is sent along with the client's request in one message from the optimization device 110.

In an aspect, the probe request is an auto-discovery probe request that can be configured to have a special payload that is incorporated in one or more option fields of the TCP SYN message originally sent from the client device 106. In another aspect, the probe request can be an Internet Control Message Protocol (ICMP) probe created by the optimization device 110 and includes a special payload, wherein the ICMP probe takes into account routing information taken from the client device's request.

Once the optimization device 110 transmits the probe request (along with or shortly after the client's request is transmitted), it waits for a probe response from the second network 120B. If no probe response is received from the second network 120B at optimization device 110, the optimization device 110 concludes that there is no available optimization tunnel at the time for the requested server 102 in the client's request (Arrow 3B in FIG. 3B).

In contrast, as shown in Block 310 in FIG. 3A, the optimization device 110 receives a probe response from a server-side optimization device 111 (Arrow 3D in FIG. 3B). The probe response may include identifying and/or configuration information of the optimization device 111, 111' and the network device(s) which the optimization device(s) 111, 111' communicates with. In an aspect, the probe response includes the ICMP probe along with the special payload data initially sent by the optimization device 110 (Arrow 3D). In particular to this aspect, the special payload data may identify the address of the optimization device as well as information associated with the original connection flow that triggered the probe (e.g. TCP destination port). In another aspect, a digital signature may be added within the special payload which verifies the integrity of the information.

Upon the optimization device 110 receiving the probe response from optimization device 111, the optimization device 110 determines whether it is already paired with the optimization device 111 which sent the probe response (Block 312).

If not, as shown as Arrow 3E in FIG. 3B, optimization devices 110 and 111 perform a pairing process that establishes an encrypted control connection between the optimization devices 110, 111 (Block 314). Thereafter, the two devices 110, 111 are configured to update one another with their respective configuration information and share connection information regarding known network devices (e.g. servers, client devices) over the control connection, whereby the configuration information will be stored in each device's 110, 111 internal memory (Block 316). Referring back to Block 312, if the optimization device 110 determines that it is already paired with the optimization device 111 which sent the probe response, the process continues to Block 316.

Thereafter, the paired optimization devices 110, 111 are able to maintain one or more optimization routes between the requesting client device 106 and the server 102 via the optimization devices 110, 111 (Block 318). The process ends at Block 320.

In an aspect, once the paired optimization devices 110, 111 have been updated with each other's configuration information, it is contemplated that one or both of the paired optimization devices 110, 111 may contact and update one or more other optimization devices 110', 111' with which it has a paired relationship of the newly obtained configuration information. This allows the optimization devices 110, 111 to advertise to all of its peers of the optimization tunnels that can be established if a client device requests access to a server that has information it that particular optimization device's configuration information.

Figure 4A:
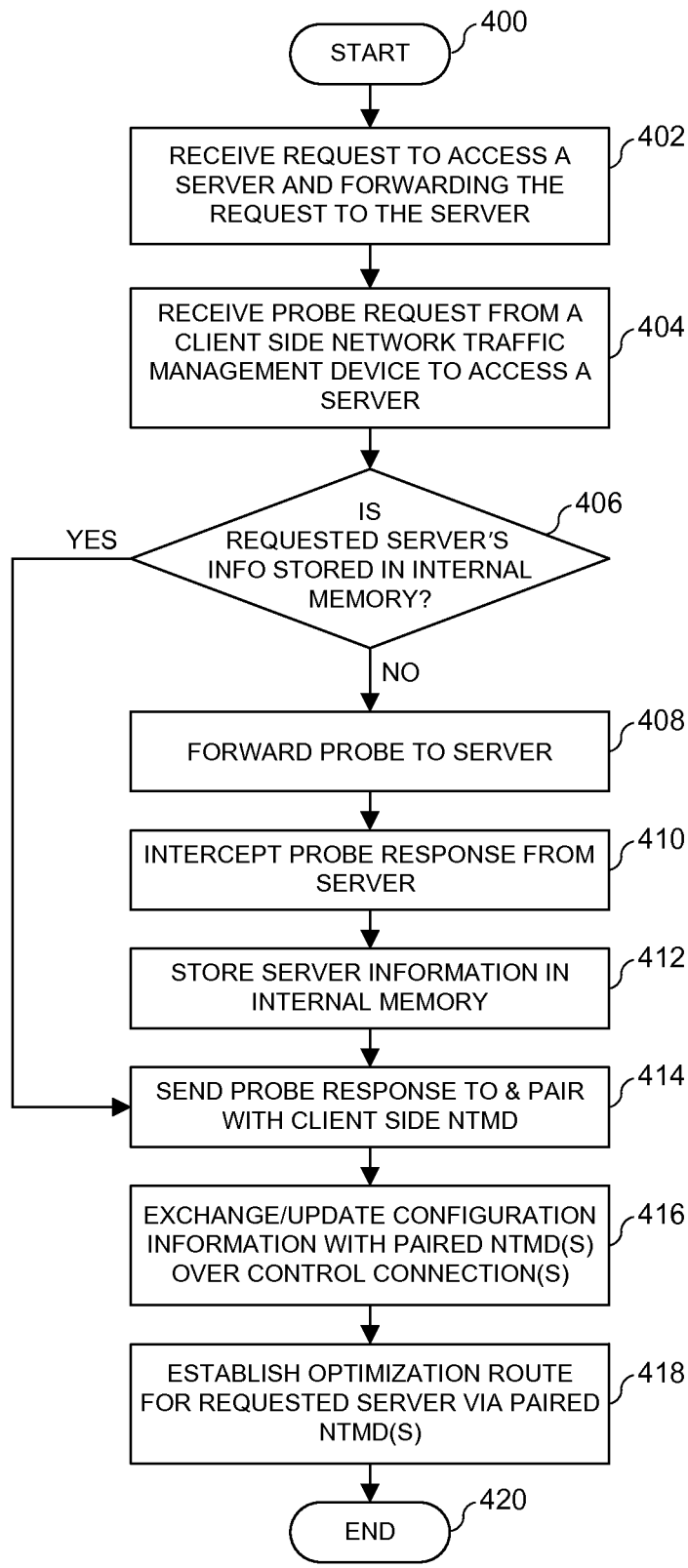
FIG. 4A is an example flow chart diagram depicting portions of processes for automatically discovering wide area network optimized routes and devices in accordance with the present disclosure.
Figure 4B:
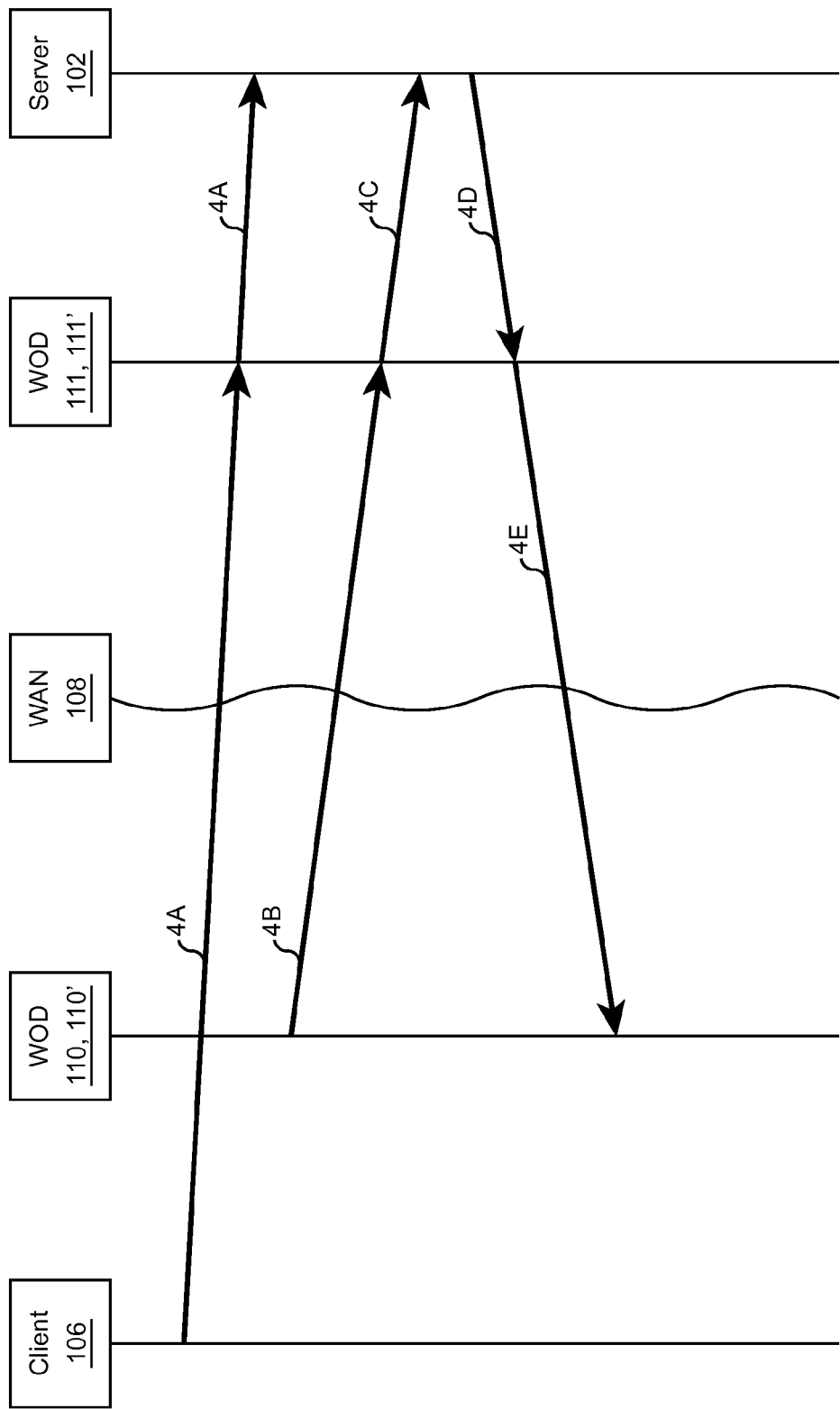
FIG. 4B illustrates an example ladder diagram depicting the processes described in FIG. 4A in accordance with an aspect of the present disclosure.

As discussed above, it is contemplated that although optimization devices 110, 111 may already be paired with one another, requested server 102 may not have previously been discovered by the optimization device 111. FIG. 4A is an example flow chart diagram depicting portions of a process for automatically discovering connected network devices in accordance with the present disclosure. FIG. 4B illustrates an example ladder diagram depicting the processes described in FIG. 4A in accordance with an aspect of the present disclosure.

With respect to FIG. 4A, the process begins at Block 400 in which the client device's request is intercepted by the optimization device 111 (shown as Arrow 4A in FIG. 4B). The optimization device 111 upon intercepting the client's request, stores the requests in a memory and allows the client's request to proceed to the requested server 102 (Block 402). Additionally, in the scenario that the optimization devices 110 and 111 are not paired, the optimization device 111 will receive a probe request from the optimization device 110 (Arrow 4B in FIG. 4B).

With regard to the probe request, the optimization device 111 accesses a memory to retrieve configuration information of the requested server 102 (Block 406). If the requested server 102 is in the optimization device's 111 configuration information, the process proceeds to Block 412, which is discussed in more detail below.

In contrast, if the requested server 102 is not found by the optimization device 111, the optimization device 111 forwards the probe request to the destination server 102 (Arrow 4C in FIG. 4B). In an aspect, the probe request can include a ICMP with a special payload, as described above.

The server 102 will then respond to the probe request in which the server probe response will contain identifying information of the responding server 102 (Block 408 in FIG. 4A; Arrow 4D in FIG. 4B). The optimization device 111 processes the server probe response Arrow 4D and stores necessary information of the responding server 102 as configuration information in a memory (Block 410). In an aspect, not only the properties of the responding server 102 may be stored, but the optimization device 111 may calculate and store other values from these properties as well. For instance, the IP address of the responding server 102 may be expanded by a mask to describe a subnet.

As shown in FIGS. 4A and 4B, the optimization device 111 sends a probe response back to the client-side optimization device 110 (Block 412 in FIG. 4A; Arrow 4E in FIG. 4B). The optimization devices 110, 111 thereafter initiate and execute the pairing process (Block 412). This can occur after Block 406 or Block 410.

The pairing process includes exchanging or updating configuration information over a control connection established between the two paired optimization devices 110, 111 (Block 414). Once both optimization devices 110, 111 are updated with each other's configuration information, an optimization route can be established between the client device 106 and the requested server 102 via the paired optimization devices 110, 111 (Block 416).

In an aspect, once the paired optimization devices 110, 111 have been updated with each other's configuration information, it is contemplated that one or both of the paired optimization devices 110, 111 may contact and update one or more other optimization devices 110', 111' with which it has a paired relationship of the newly obtained configuration information. This allows the optimization devices 110, 111 to advertise to all of its peers of the optimization tunnels that can be established if a client device requests access to a server that has information it that particular optimization device's configuration information.

Having thus described the basic concepts, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the examples. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method of automatically discovering optimized routes, the method comprising:
   receiving a request by a client-side optimization device from a client device to access a server identified in the request;
   sending, by the client-side optimization device, the request received from the client device and a probe request to the server;
   receiving, by the client-side optimization device and from a server-side optimization device, a probe response to the probe request and identifying information for a plurality of servers including the server that are in communication with the server-side optimization device;
   storing, by the client-side optimization device, the identifying information;
   communicating, by the client-side optimization device, the identifying information for the plurality of servers received from the server-side optimization device to at least one other client-side optimization device; and
   establishing, by the client-side optimization device, an optimization route with the server-side optimization device, wherein the optimization route allows network communications to be communicated between the client device and the server.

2. The method of claim 1 further comprising retransmitting, by the client-side optimization device, the probe request when a probe response is not received within a predetermined amount of time.

3. The method of claim 1 further comprising establishing, by the client-side optimization device, a secured control connection with the server-side optimization device, wherein the identifying information is received via the secured control connection.

4. The method of claim 3 further comprising obtaining, by the client-side optimization device, optimization device configuration information for the server-side optimization device via the secured control connection, the optimization device configuration information comprising health information, capability information, cache allocation information, a version number, a device name, a list of routes, or special hardware information.

5. A non-transitory machine readable medium having stored thereon instructions for automatically discovering optimized routes, comprising machine executable code which when executed by at least one processor, causes the processor to perform steps comprising:
   receiving a request from a client device to access a server identified in the request;
   sending the request received from the client device and a probe request to the server;
   receiving, from a server-side optimization device, a probe response to the probe request and identifying information for a plurality of servers including the server that are in communication with the server-side optimization device;
   storing the identifying information;
   communicating the identifying information for the plurality of servers received from the server-side optimization device to at least one other client-side optimization device; and
   establishing an optimization route with the server-side optimization device, wherein the optimization route allows network communications to be communicated between the client device and the server.

6. The non-transitory machine readable medium of claim 5 further having stored thereon instructions comprising machine executable code which when executed by the processor cause the processor to perform steps further comprising retransmitting the probe request when a probe response is not received within a predetermined amount of time.

7. The non-transitory machine readable medium of claim 5 further having stored thereon instructions comprising machine executable code which when executed by the processor cause the processor to perform steps further comprising establishing a secured control connection with the server-side optimization device, wherein the identifying information is received via the secured control connection.

8. The non-transitory machine readable medium of claim 7 further having stored thereon instructions comprising machine executable code which when executed by the processor cause the processor to perform steps further comprising obtaining optimization device configuration information for the server-side optimization device via the secured control connection, the optimization device configuration information comprising health information, capability information, cache allocation information, a version number, a device name, a list of routes, or special hardware information.

9. A client-side optimization device comprising a memory comprising programmed instructions stored in the memory and a processor configured to be capable of executing the programmed instructions to:
receive a request from a client device to access a server identified in the request;
send the request received from the client device and a probe request to the server;
receive, from a server-side optimization device a probe response to the probe request and identifying information for a plurality of servers including the server that are in communication with the server-side optimization device;
store the identifying information;
communicate the identifying information for the plurality of servers received from the server-side optimization device to at least one other client-side optimization device; and
establish an optimization route with the server-side optimization device, wherein the optimization route allows network communications to be communicated between the client device and the server.

10. The device of claim 9 wherein the processor is further configured to be capable of executing the programmed instructions to retransmit the probe request when a probe response is not received within a predetermined amount of time.

11. The device of claim 9 wherein the processor is further configured to be capable of executing the programmed instructions to establish a secured control connection with the server-side optimization device, wherein the identifying information is received via the secured control connection.

12. The device of claim 11 wherein the processor is further configured to be capable of executing the programmed instructions to obtain optimization device configuration information for the server-side optimization device via the secured control connection, the optimization device configuration information comprising health information, capability information, cache allocation information, a version number, a device name, a list of routes, or special hardware information.

* * * * *